(12) United States Patent
Issel et al.

(10) Patent No.: US 7,770,435 B2
(45) Date of Patent: Aug. 10, 2010

(54) PIPELINE HAVING A COLLECTOR LINE AND METHOD FOR LEAKAGE MONITORING AND LEAKAGE LOCATION

(75) Inventors: Wolfgang Issel, Karlsruhe (DE); Peter Jax, Erlangen (DE)

(73) Assignee: Areva NP GmbH, Erlangen (DE)

( * ) Notice: Subject to any disclaimer, the term of this patent is extended or adjusted under 35 U.S.C. 154(b) by 108 days.

(21) Appl. No.: 11/848,392

(22) Filed: Aug. 31, 2007

(65) Prior Publication Data

US 2008/0053198 A1 Mar. 6, 2008

Related U.S. Application Data

(60) Provisional application No. 60/841,853, filed on Sep. 1, 2006.

(30) Foreign Application Priority Data

Sep. 1, 2006 (DE) .................... 10 2006 041 498
Feb. 7, 2007 (DE) .................... 10 2007 006 014

(51) Int. Cl.
*G01M 3/04* (2006.01)
*G01N 1/22* (2006.01)

(52) U.S. Cl. ...................... 73/40; 73/863.23
(58) Field of Classification Search ............... 73/64.56, 73/863.23, 40; 138/141, 145, 146
See application file for complete search history.

(56) References Cited

U.S. PATENT DOCUMENTS

| 3,977,233 | A |   | 8/1976  | Issel |
|-----------|---|---|---------|-------|
| 4,735,095 | A | * | 4/1988  | Issel .................... 73/864.81 |
| 5,203,202 | A | * | 4/1993  | Spencer ................. 73/40.5 R |
| 5,574,377 | A | * | 11/1996 | Marquez-Lucero et al. . 324/533 |
| 5,992,217 | A | * | 11/1999 | Jax et al. ................... 73/40 |
| 6,088,417 | A | * | 7/2000  | Jax et al. ................. 376/250 |

FOREIGN PATENT DOCUMENTS

| CA | 2 570 274 A1 | 8/2006 |
| DE | 24 31 907 C3 | 1/1976 |
| DE | 24 53 215    | 5/1976 |
| DE | 27 23 488 C3 | 11/1978 |
| EP | 0 175 219 B1 | 3/1986 |
| WO | 2006/089629 A1 | 8/2006 |

* cited by examiner

*Primary Examiner*—Hezron Williams
*Assistant Examiner*—Nathaniel Kolb
(74) *Attorney, Agent, or Firm*—Laurence A. Greenberg; Werner H. Stemer; Ralph E. Locher

(57) ABSTRACT

A collector line for leakage monitoring and leakage location at a plant includes a carrier tube having a wall with openings formed therein, which are sealed with silicone rubber. This makes it possible to use the collector line during low ambient temperatures. A device and a method for leakage monitoring and leakage location and a pipeline having a collector line, are also provided.

10 Claims, 4 Drawing Sheets

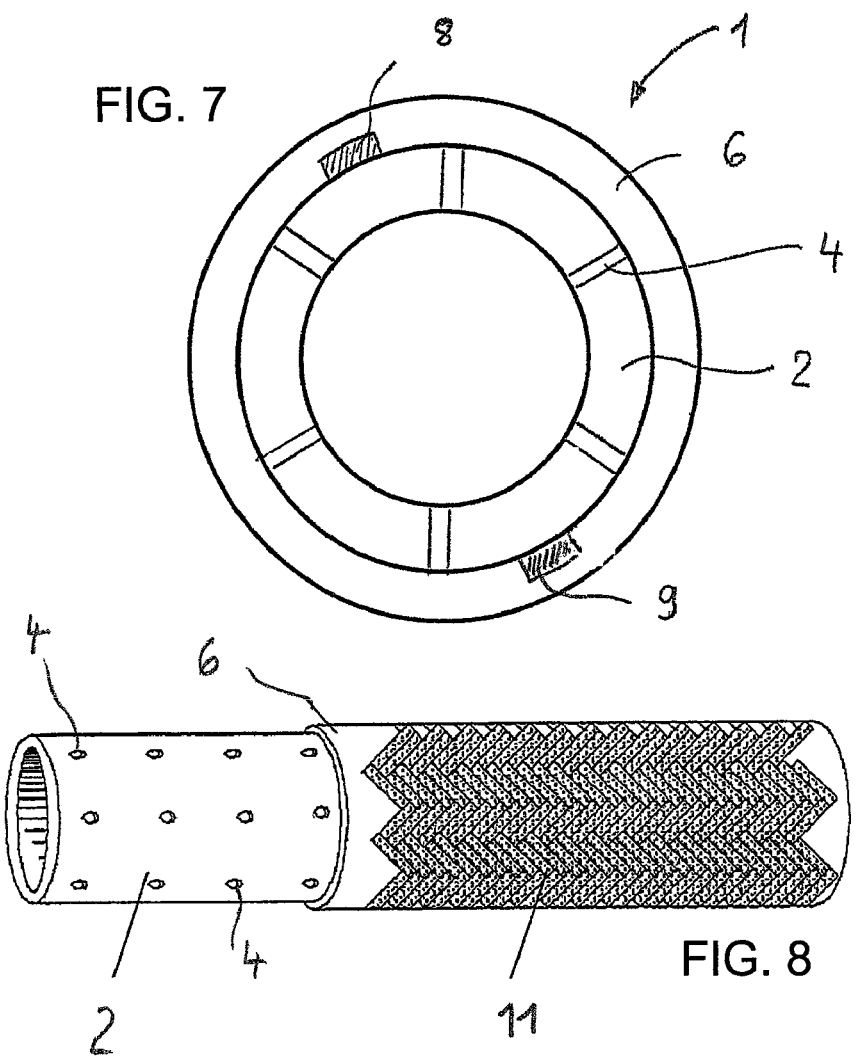
FIG. 7
FIG. 8
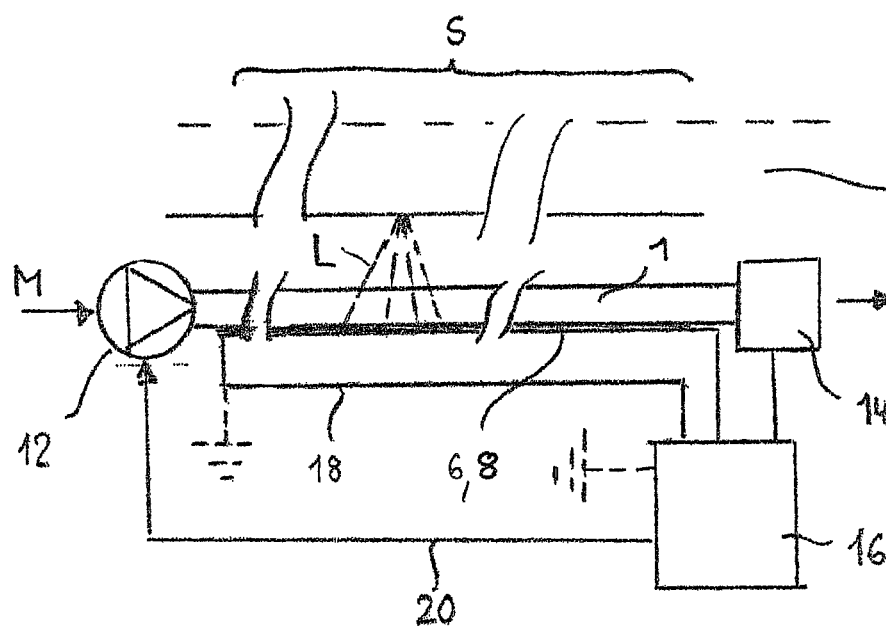
FIG. 9

PIPELINE HAVING A COLLECTOR LINE AND METHOD FOR LEAKAGE MONITORING AND LEAKAGE LOCATION

CROSS-REFERENCE TO RELATED APPLICATION

This application claims the priority, under 35 U.S.C. §119, of German Patent Applications DE 10 2006 041 498.5, filed Sep. 1, 2006, and DE 10 2007 006 014.0, filed Feb. 7, 2007 and U.S. Provisional Patent Application No. 60/841,853, filed Sep. 1, 2006; the prior applications are herewith incorporated by reference in their entirety.

BACKGROUND OF THE INVENTION

Field of the Invention

The invention relates to a collector line for leakage monitoring and leakage location at a plant or installation, such as is known from European Patent EP 0 175 219 B1, corresponding to U.S. Pat. No. 4,735,095. The invention moreover relates to a device and a method for leakage monitoring and leakage location at a plant in which such a collector line is used, as well as a pipeline having a collector line.

A collector line, which is known from European Patent EP 0 175 219 B1, corresponding to U.S. Pat. No. 4,735,095, is formed of a carrier tube that is provided with a permeable layer on its exterior surface, through which a substance from a leakage in the plant, for example a pipeline, which escapes into the environment of the collector line and must be detected, can diffuse. The carrier tube is impermeable to that substance. Its wall is provided with openings so that any substance passing through the permeable layer can reach the inside of the collector line through the openings. The location at which the substance has penetrated into the collector line can then be determined by using a method known from German Patent DE 24 31 907 C3, corresponding to U.S. Pat. No. 3,977,233. That location corresponds to the place at which the substance has escaped from the monitored plant section. For that purpose, the substance which has penetrated into the collector line is fed by a pump connected to the collector line, together with a carrier gas contained in the collector line, to a sensor which is also connected to the collector line. If the flow rate is known, the location at which the substance penetrates into the collector line and thus the location of the leakage in the plant section, can be determined by using the time interval between switch-on of the pump and when the substance arrives at the sensor.

Ethylene vinyl acetate, EVA, was found to be particularly suitable as a material for the permeable layer, in a multiplicity of applications. However, the use of EVA as a permeable layer is problematic under environmental conditions where very low temperatures can occur, such as during the monitoring of aboveground installed oil pipelines, such as is the case in arctic and subarctic areas. Since it has been shown that the diffusion rate of the substances to be detected through a wall of EVA exponentially drops with the temperature, in practice it limits the range of applications with EVA as a permeable layer in such collector lines to temperatures above 0° C.

SUMMARY OF THE INVENTION

It is accordingly an object of the invention to provide a collector line, a device and a method for leakage monitoring and leakage location at a plant and a pipeline having a collector line, which overcome the hereinafore-mentioned disadvantages of the heretofore-known devices and methods of this general type and which are also suitable for use at low temperatures.

With the foregoing and other objects in view there is provided, in accordance with the invention, a collector line for leakage monitoring and leakage location at a plant or installation. The collector line comprises a carrier tube having a wall with openings formed therein. At least one first layer closes the openings and, in particular, completely covers an exterior surface of the carrier tube, is formed of silicone rubber and is permeable to a substance to be detected.

The term formed of silicone rubber, within the context of the present invention, means that this is the base matrix or the base material of the first layer to which further fillers or additives may have been added.

The invention is thus based upon the knowledge that silicone rubber, even though it is normally used as an elastic sealant, in particular has high permeability for crude or mineral oils and gasoline and because of its high low temperature stability has high permeability even at low temperatures and is therefore suitable as a permeable layer of a collection line, even for use under environmental conditions in which low temperatures can occur.

In accordance with another feature of the invention, the carrier tube includes a second electrically conductive layer which extends in the longitudinal direction thereof, into which the substance may penetrate and which has an ohmic resistance that is dependent on the level of penetrant material therein. With such a collection line, the presence of a substance escaping during a leakage from the plant in large quantities can be permanently monitored by measuring the resistance of the electrically conductive, substance sensitive layer between two measuring points which are spatially far apart from each other. In other words: permanent leakage monitoring is possible, independently of the times at which a pump connected to the collection line is switched on.

This has the advantage of permitting large leakages to be registered with a very short time delay. In fact, in order to be able to register even small leakages with the known leakage monitoring and leakage location device, relatively long collection times are required which can be up to 24 hours. It is only then, in view of the unavoidable longitudinal diffusion and the absorption that occurs inside of the collection line over an extended section, that a sufficient quantity of the substance to be detected has penetrated into the collection line in order to be able to transfer it to the sensor at a concentration necessary for detection. Particularly with long collection lines, such as are laid along pipelines, the carrier gas is therefore conveyed through the collection line at larger time intervals or interrogation intervals, for example every 6 to 24 hours, so that in the least favorable case, a time interval between the occurrence of the leakage and its detection can pass that is composed of the time interval between two consecutive measurements and the time which the penetrant substance requires from the start of the pump sequence until it arrives at the sensor. A time interval on the order of several hours can, however, be accompanied by significant irreversible damage, particularly in the case of larger leakages, both to the plant as well as to the environment.

That damage can be prevented by using a collection line with an electrically conductive second layer, since with such a collection line both a high detection sensitivity in the event of small leakages, as well as a high speed of response in the event of large leakages, can be achieved.

In accordance with a further feature of the invention, the electrically conductive layer is formed of a carbon black filled polymer material, which preferably likewise involves a silicone rubber. This facilitates the electrically conductive layer to be produced in a particularly cost effective manner since, on one hand, it can likewise be applied to the carrier tube just as easily as a layer made of pure silicone rubber, i.e. one that is not filled with carbon black, and by filling it with fine-grained carbon black, in which the grain size is preferably within the nm range, the electrical conductivity of the carbon black particles in contact with each other can be brought about through the development of contact bridges between them in a particularly simple manner and since, on the other hand, the electrical conductivity of the carbon-black filled silicone rubber largely depends upon the swelling that occurs during the penetration of the substance and the accompanying destruction of the carbon black bridges.

Since the electrically conductive layer is also permeable in this case, it can completely cover the exterior surface of the carrier tube. In this development, the electrically conductive layer can also be used to monitor the collector line with respect to mechanical damage, for example fracture.

In accordance with an added feature of the invention, the permeable first layer is electrically insulating and covers the electrically conductive second layer, and therefore the electrically conductive layer is electrically insulated from the environment, so that the collector line can also be installed in the ground or in contact with electrically conductive plant components. Moreover, in the event that the electrically conductive second layer is permeable and surrounds the carrier tube completely and thus also seals the openings contained therein, a decrease in the permeation rate caused by the admixture of carbon black can be reduced, since this electrically conductive permeable layer only has to have a thickness to the extent that is necessary for monitoring of the electrical resistance and/or the electrical conductivity.

In accordance with an additional feature of the invention, a particularly simple embodiment provides for only one first permeable layer, which is electrically conductive through the admixture of carbon black, so that its electrical resistance depends on the level of penetrant material therein. In one such development, both a high detection sensitivity as well as a high speed of response can be achieved with a one-layer collector line.

With the objects of the invention in view, there is also provided a device for leakage monitoring and leakage location at a plant or installation. The device comprises a collector line according to the invention and a device for recording an electrical resistance of the electrically conductive layer.

By measuring the electrical resistance of the electrically conductive layer, permanent leakage monitoring is possible with little effort in terms of apparatus and technical measurement complexity.

With the objects of the invention in view, there is additionally provided a method for leakage monitoring and location. The method comprises recording an electrical resistance of an electrically conductive layer along a segment of an installed collector line according to the invention, triggering a measurement to determine a leakage location upon an increase in the electrical resistance, and pumping a fluid carrier medium through the collector line and analyzing the fluid carrier medium with a sensor for a material escaping during a leakage.

In the method, the time interval between the occurrence of a leakage and leakage location is reduced by using an increase in resistance as a tripping or triggering signal for performing a measurement to locate the leakage, in that a fluid carrier medium is pumped through the collector line and analyzed with a sensor for a substance that escapes during the leakage.

A leakage location is therefore no longer exclusively performed at fixed specified time intervals, but in addition or only when the occurrence of a leakage is detected by resistance measurement.

With the objects of the invention in view, there is furthermore provided a pipeline. The pipeline comprises an inner pipe conveying a material and having a longitudinal axis, a thermal insulation layer surrounding the inner pipe, a channel extended in the thermal insulation layer parallel to the longitudinal axis of the inner pipe, and a collector line according to the invention disposed in the channel.

A collector line of the type mentioned at the outset, in particular a collector line as taught by the invention, is particularly suited for monitoring of a pipeline carrying the substance.

Such a pipeline can be particularly easily provided with a collector line of the type mentioned at the outset. The collector line is moreover protected against environmental effects through this measure.

In accordance with another feature of the invention, the channel is formed by an auxiliary pipe embedded into the insulation layer, so that the subsequent introduction of the collector line is simplified and the risk of damaging the insulation layer during the installation of the collector line is decreased.

In accordance with a concomitant feature of the invention, the channel is preferably disposed at a distance from the inner pipe. As a result, the entire exterior surface of the inner pipe contacts the insulation layer, and its adhesion to the inner pipe is not impaired by the channel.

Other features which are considered as characteristic for the invention are set forth in the appended claims.

Although the invention is illustrated and described herein as embodied in a collector line, a device and a method for leakage monitoring and leakage location and a pipeline having a collector line, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 4-7 are cross-sectional views illustrating further advantageous developments of a collector line according to the invention;

FIG. 8 is a perspective view of a collector line according to the invention, which is provided with pressure resistant braiding;

FIG. 9 is a schematic and block diagram of a device with a collector line according to FIGS. 4-7.

DETAILED DESCRIPTION OF THE INVENTION

Figure 1:
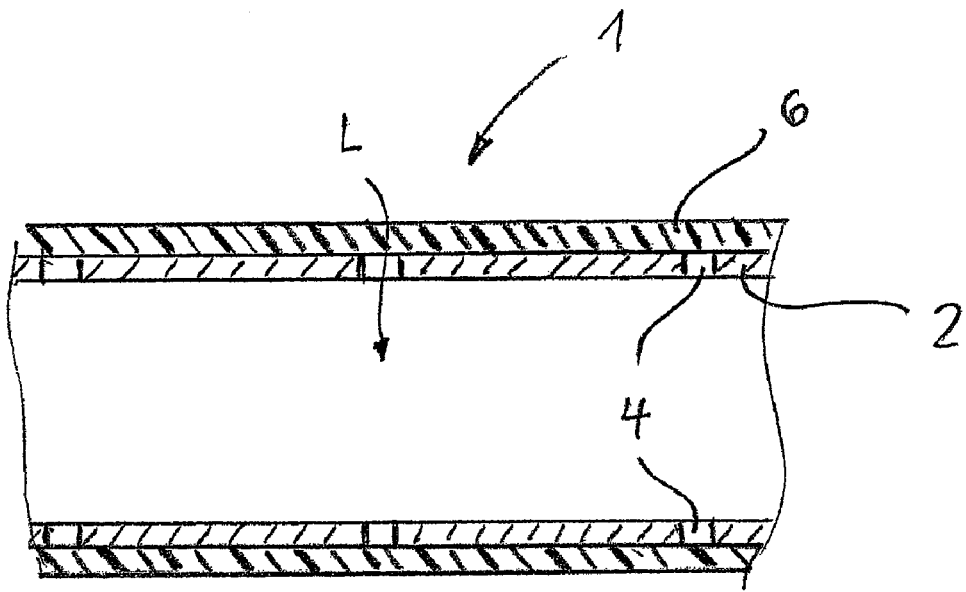
FIGS. 1 and 2 are respective diagrammatic, fragmentary longitudinal-sectional and cross-sectional views of a collector line according to the invention.
Figure 2:
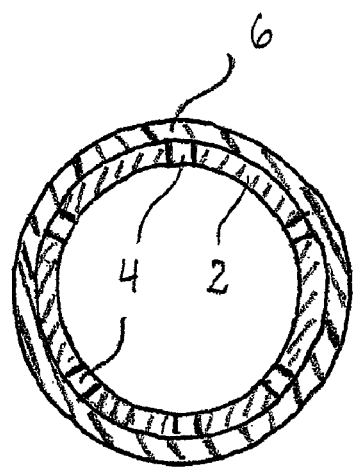

Referring now to the figures of the drawings in detail and first, particularly, to FIGS. 1 and 2 thereof, there is seen a collector line 1 which includes a carrier tube 2, for example of polyvinyl chloride PVC, in particular of polyvinylidene fluoride PVDF or polyether ketone PEEK, in which a wall is provided with a multiplicity of radial openings 4. A contiguous first layer 6 formed of silicone rubber, which is permeable to a substance L to be detected, is disposed on the carrier tube 2, completely covers the carrier tube 2 and seals the openings 4 in this manner. Cross-linked silicones, organopolysiloxanes, particularly wide-meshed cross-linked silicone rubbers (diorganopolysiloxanes) with particularly high absorptivity of the substance L to be detected, i.e. polysiloxanes, which exhibit high swelling in the presence of the substance L, particularly the commercially available MVQ HTV silicone rubber (HCR silicone rubber) SX 70 W which is formed of a mixture of polymethylvinyl-siloxanes and highly dispersed silicic acids or alternatively of a mixture of polydimethylsiloxanes, polyvinylmethylsiloxanes, polyphenylmethylsiloxanes, polyphenylvinylmethylsiloxanes and silicic acids, are particularly suitable.

Figure 3:
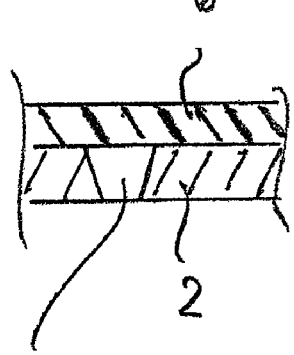
FIG. 3 is an enlarged, fragmentary longitudinal-sectional view of an alternative embodiment of openings made in the collector line.

FIG. 3 represents an embodiment in which the openings 4 have a conical shape, taper toward the inside of the carrier tube 2 and are filled with a porous filler material, which in practice does not impede a diffusion of the substance L into the inside of the carrier tube 2. This facilitates the covering of the carrier tube 2 with a permeable first layer 6 which is formed of silicone rubber, since this can also be applied in this case in a low viscosity liquid condition, without filling the openings 4 or flowing into the inside of the carrier tube 2. As an alternative to this, it is also possible to incorporate the openings 4 through suitable manufacturing methods, for example laser drilling, in large numbers into the carrier tube 2 and with a very small diameter, so that the silicone rubber, even when it is applied in liquid condition, in practice cannot penetrate into these openings 4.

Figure 4:
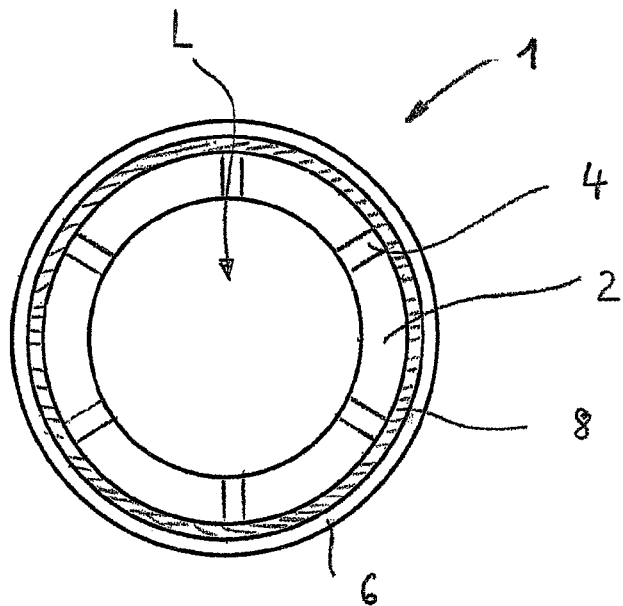

In the exemplary embodiment according to FIG. 4, an electrically conductive second layer 8 has been applied to the exterior surface of the carrier tube 2. The second layer 8 is surrounded by a permeable first layer 6, which is also electrically insulating in this embodiment. This electrically conductive second layer 8 is equally permeable for the substance L to be detected and moreover reacts sensitively to the substance L in such a manner that its (specific) electrical resistance is dependent upon the presence of the substance L.

The electrically conductive second layer 8 in the exemplary embodiment is formed of a polymer material filled with electrically conductive particles, which in this case involves an electrically isolating polymer base material, in particular also a silicone rubber, to which conductive particles have been admixed in order to bring about electrical conductivity. The conductive particles are carbon black, in this example.

The electrically conductive second layer 8 experiences a change in its structure, such as swelling, due to the substance L entering and passing through it. In this manner, bridges between the electrically conductive particles break open and the electrical conductivity which is based upon these bridges in the silicone rubber to which these conductive particles have been added, deteriorates.

The proportion of carbon black needed in practice depends on the length of the collector line, in order to achieve electrical resistance values in the range of several mΩ that can be registered by using little technical measurement complexity.

In the exemplary embodiment, the layer thicknesses of the layers 6 and 8 are 1 mm in each case. The wall thickness of the carrier tube 2, which preferably is formed of PVDF or PEEK, is approximately 1 mm, with an inside diameter of approximately 10 mm.

The exterior, electrically insulating, permeable first layer 6 is moreover surrounded by non-illustrated permeable, elastic protective braiding, for protection against mechanical damage.

The carrier tube 2 can moreover be provided with a coating on its internal surface area, which is formed of a material that has only a low absorption capacity for the substance L, in order to extensively reduce a signal attenuation by absorption in the carrier tube 2, which develops if the distance between the leakage location and the detection sensor is large. This coating, which is made of TEFLON® PTFE, for example, is applied to the internal surface area, before the radial openings 4 are made in the carrier tube.

Figure 5:
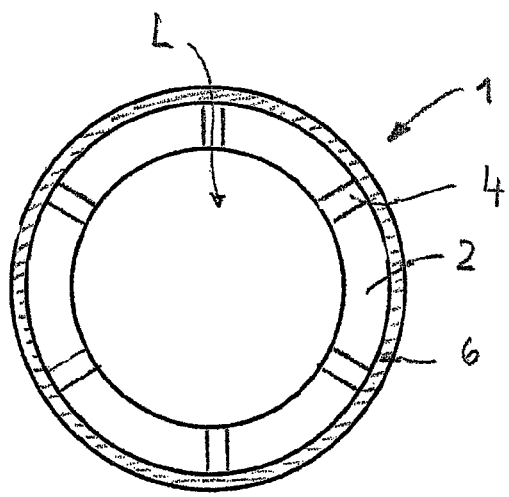

According to FIG. 5, a single-layer structure is provided in which the first layer 6, which is permeable to the substance L, is electrically conductive through admixture of carbon black. In other words: only one single layer is provided which combines both the properties of the first layer 6, that is the good permeability for the substance L to be detected, as well as the properties of the electrically conductive second layer 8, that is the change in the electrical resistance, if the substance L penetrates into it.

In principle, it is also not mandatory that the electrically conductive second layer 8, in the presence of an electrically insulating permeable first layer 6 which completely surrounds the carrier tube 2, covers the tube completely. In the exemplary embodiment according to FIG. 6, the electrically conductive second layer 8 covers only a band-shaped subarea of the exterior surface of the carrier tube 2, which extends in a longitudinal direction.

In other words: the electrically conductive second layer 8 and the permeable first layer 6 are disposed side-by-side on the carrier tube 2. In this exemplary embodiment, it is also not mandatory that the second layer 8 be permeable for the substance L.

Figure 6:
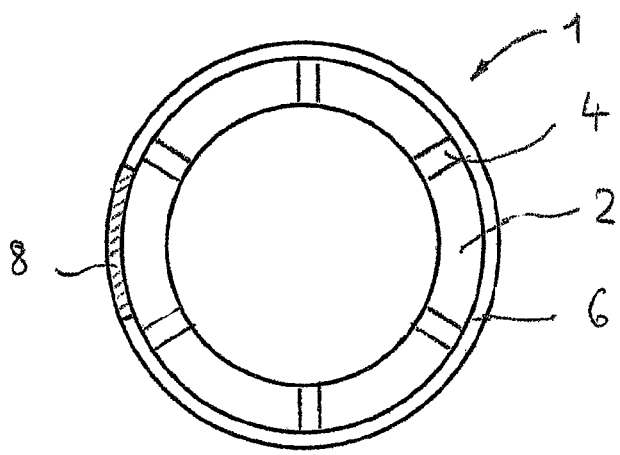

In the embodiments illustrated in FIGS. 5 and 6, the collector line 1 is suitable for installation in an electrically insulating environment.

In the exemplary embodiment illustrated in FIG. 7, the electrically conductive second layer 8 has the shape of a band that is embedded in the first layer 6, which in this exemplary embodiment is electrically insulating and insulates the band-shaped second layer 8 to be electrically insulated from the environment, in order to facilitate the use of the collector line 1 in an electrically conductive environment. In addition, a band-shaped return conductor 9 is embedded into the first layer 6, only occupies one sector of the circumference of the carrier tube 2, and has an electrical resistance which is not affected by the substance L. This return conductor 9 is electrically connected at one end of the collector line 1 with the second layer 8, which enables its resistance to be measured. Alternatively thereto, the return conductor 9 can also be formed of the same material as the second layer 8, so that its resistance is likewise affected by the substance L.

In addition, in all of the exemplary embodiments according to FIG. 1 to FIG. 7, the collector line 1 can be enveloped on the outer periphery with a permeable braiding 11, as is illustrated in FIG. 8. This braiding 11, which can be formed of polyethylene PE for example, serves both as protection against mechanical damage as well as for mechanical stabilization, if excess pressure exists on the inside of the carrier tube 2 for conveying the carrier gas, which would result in a destruction of the silicone rubber layer 6 that covers the openings 4.

According to FIG. 9, the collector line 1 is laid along a pipeline 10 between a pump 12 and a sensor 14 for the substance L to be detected. An evaluation and control unit 16 permanently or continuously measures the electrical resistance of the electrically conductive layer 6, 8 along a section s, i.e. it is also measured even when the pump 12 is not activated, i.e. when a fluid carrier medium M inside the carrier tube 2 is at rest. As an example thereof, a separate return conductor 18 is installed along the collector line 1. If the resistance of the electrically conductive second layer 8 exceeds a specified threshold value because of a leakage of an escaping substance L in the environment of the collector line 2 (shown by a dotted line), a control signal 20 is generated in the control and evaluation unit 16 in order to start up the pump 12 and perform a leakage location in accordance with the known method discussed at the outset herein.

Depending upon the installation location of the collector line 1, it can also be possible that a separate return conductor 18 or a return conductor 9 integrated into the collector line 1 (FIG. 4) is not necessary, in that, for example, a ground contact is established at a terminal point of the section, as is indicated in this figure by dotted lines.

Figure 10:
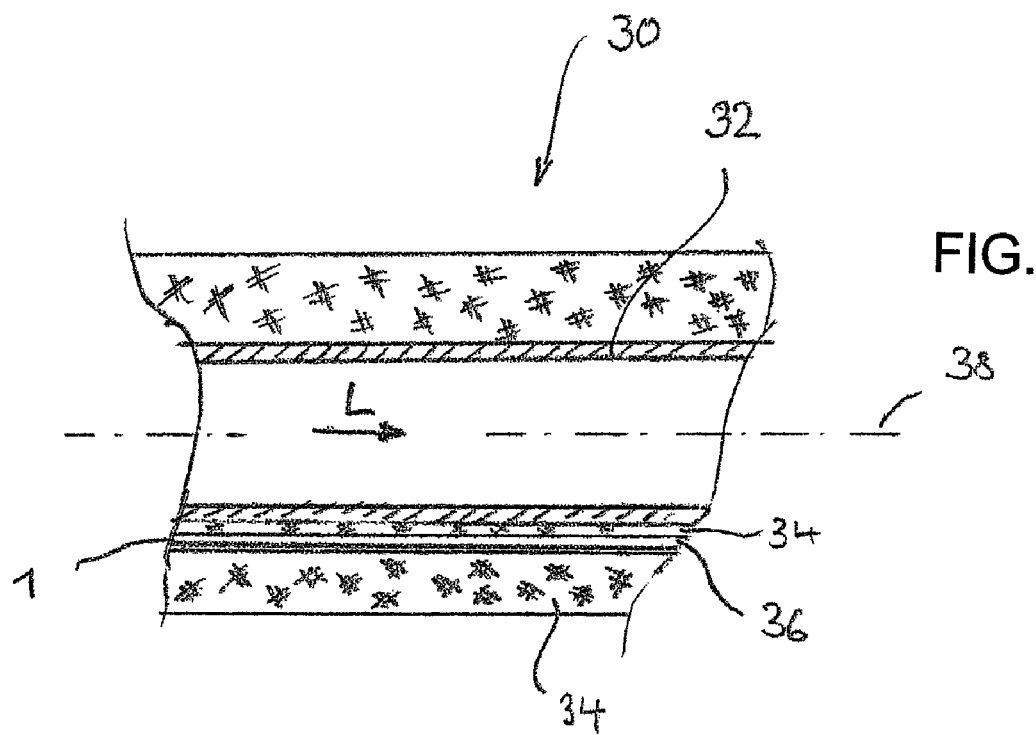
FIGS. 10 and 11 are respective fragmentary, longitudinal-sectional and cross-sectional views of a particularly advantageous configuration of a collector line according to the invention in a pipeline carrying crude oil.

According to FIG. 10, a pipeline 30 conveying the substance L, for example crude oil, includes an inner pipe 32 of steel, which is surrounded by an insulation layer 34 formed of polyurethane. A channel 36 is introduced into the insulation layer 34 at a small distance from the exterior surface of the inner pipe 32. The channel 36 runs parallel to a longitudinal axis 38 of the inner pipe 32 and a collector line 1 is installed in the channel 36, as is diagrammatically illustrated.

Figure 11:
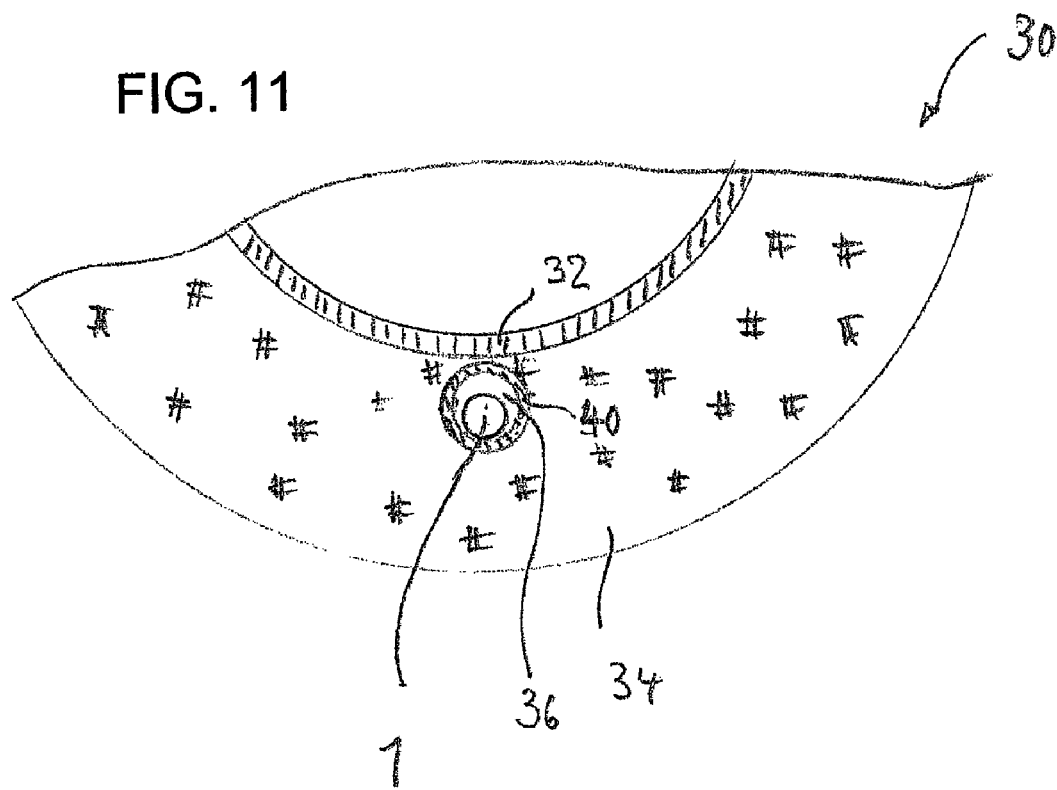

In the exemplary embodiment according to FIG. 11, a channel 36 is formed by an auxiliary pipe 40 embedded in the insulation layer 34. The collector line 1 can be inserted into the channel 36. The auxiliary pipe 40 is perforated with holes or slots and is thus open for the substance L to pass through. The substance L is conveyed in a pipeline 30 and escapes from an inner pipe 32 in case of leakage.

With a pipeline 30 configured in this way and a collector line 1 installed therein, any leakages occurring in the inner tube 32 can already be detected before they escape into the environment or surroundings of the pipeline 30, since the escaping substance L initially reaches the insulation layer 34, where it accumulates and diffuses into the collector line 1.

The invention claimed is:

1. A pipeline, the pipeline comprising:
    an inner pipe conveying a material and having a longitudinal axis;
    a thermal insulation layer surrounding said inner pipe;
    a channel extended in said thermal insulation layer parallel to said longitudinal axis of said inner pipe;
    an auxiliary pipe embedded in said insulation layer, perforated with holes or slots and forming said channel; and
    a collector line disposed in said channel for leakage monitoring and leakage location at said inner pipe, said collector line including:
        a carrier tube being impermeable to a substance to be detected and having a wall with openings formed therein; and
        a at least one first layer closing said openings, being formed of silicone rubber and being permeable to the substance to be detected.

2. The pipeline according to claim 1, which further comprises an electrically conductive second layer extended in longitudinal direction of said carrier tube, said electrically conductive second layer being at least penetrable by the substance and having an ohmic resistance dependent on a level of penetrant material therein.

3. The pipeline according to claim 2, wherein said electrically conductive second layer is formed of a carbon black filled polymer material.

4. The pipeline according to claim 3, wherein said carbon black filled polymer material is a carbon black filled silicone rubber.

5. The pipeline according to claim 4, wherein said electrically conductive second layer completely covers an exterior surface of said carrier tube.

6. The pipeline according to claim 2, wherein said first layer is electrically insulating and covers said electrically conductive second layer.

7. A device for leakage monitoring and leakage location at a plant, the device comprising:
    a pipeline according to claim 2; and
    a device for recording an electrical resistance of said electrically conductive layer.

8. A method for leakage monitoring and location, the method comprising the following steps:
    recording an electrical resistance of an electrically conductive layer along a segment of an installed pipeline according to claim 2;
    triggering a measurement to determine a leakage location upon an increase in the electrical resistance; and
    pumping a fluid carrier medium through the collector line and analyzing the fluid carrier medium with a sensor for a material escaping during a leakage.

9. The pipeline according to claim 1, wherein said first permeable layer is electrically conductive due to an admixture of carbon black.

10. The pipeline according to claim 1, wherein said channel is disposed at a distance from said inner pipe.

* * * * *